US012502667B2

(12) United States Patent
Huff et al.

(10) Patent No.: US 12,502,667 B2
(45) Date of Patent: Dec. 23, 2025

(54) DEVICES AND METHODS FOR FLUID ACTUATION

(71) Applicant: ABBOTT LABORATORIES, Abbott Park, IL (US)

(72) Inventors: Jeffrey B. Huff, Lincolnshire, IL (US); Mark A. Hayden, Vernon Hills, IL (US); Nicholas John Collier, Burwell (GB); Stephen Brown, Hatfield Broad Oak (GB); Karen Xin Zhou Yu, Cambridge (GB)

(73) Assignee: Abbott Laboratories, Abbott Park, IL (US)

( * ) Notice: Subject to any disclaimer, the term of this patent is extended or adjusted under 35 U.S.C. 154(b) by 887 days.

(21) Appl. No.: 17/540,993

(22) Filed: Dec. 2, 2021

(65) Prior Publication Data

US 2022/0088600 A1 Mar. 24, 2022

Related U.S. Application Data

(63) Continuation of application No. PCT/US2020/035934, filed on Jun. 3, 2020.

(Continued)

(51) Int. Cl.
*B01L 3/00* (2006.01)

(52) U.S. Cl.
CPC ..... *B01L 3/502715* (2013.01); *B01L 2200/16* (2013.01); *B01L 2300/0645* (2013.01); *B01L 2300/0819* (2013.01)

(58) Field of Classification Search
CPC ......... B01L 3/502715; B01L 3/502784; B01L 2300/0848; B01L 2400/0424;

(Continued)

(56) References Cited

U.S. PATENT DOCUMENTS

| | | | | |
|---|---|---|---|---|
| 9,421,555 | B2 * | 8/2016 | Lee | B03C 1/02 |
| 9,782,775 | B2 * | 10/2017 | Akella | F04B 19/006 |

(Continued)

FOREIGN PATENT DOCUMENTS

| | | | |
|---|---|---|---|
| AU | 2014200406 | A1 | 2/2014 |
| WO | 2011126892 | A2 | 10/2011 |
| WO | 2011126892 | A3 | 10/2011 |

OTHER PUBLICATIONS

International Search Report and Written Opinion dated Sep. 9, 2020, corresponding to International Patent Application No. PCT/US2020/035934.

*Primary Examiner* — Shogo Sasaki
(74) *Attorney, Agent, or Firm* — Bozicevic, Field & Francis LLP; Edward J. Baba; Mandar A. Joshi

(57) ABSTRACT

System for storing and dispensing liquid in a digital microfluidic chip includes a plurality of reservoir electrodes defining a reservoir having an outlet and a first end opposite the outlet, the reservoir configured to be in fluidic communication with at least one device electrode proximate the outlet, the at least one device electrode and at least one of the plurality of reservoir electrodes configured to generate electrical actuation forces to dispense at least one droplet from the reservoir through the outlet. The plurality of reservoir electrodes include a first reservoir electrode proximate the first end, a reservoir outlet electrode proximate the outlet, and at least one intermediate reservoir electrode disposed between the first electrode and the reservoir outlet electrode. The first reservoir electrode, the reservoir outlet electrode, and the at least one intermediate reservoir electrode each has an electrode surface area in plan view greater than or equal to an electrode surface area of each of the at least one device electrodes.

16 Claims, 4 Drawing Sheets

Related U.S. Application Data

(60) Provisional application No. 62/856,584, filed on Jun. 3, 2019.

(58) Field of Classification Search
CPC ............ B01L 2400/02; B01L 2200/16; B01L 2200/027; B01L 2300/0645; B01L 2200/12; B01L 2300/0887; B01L 2400/0427; B01L 2300/0819; B01L 2300/0816; B01L 2300/0867; B01L 2400/0421
See application file for complete search history.

(56) References Cited

U.S. PATENT DOCUMENTS

| | | | | |
|---|---|---|---|---|
| 11,684,916 | B2 * | 6/2023 | Yao | B01L 3/502792 422/502 |
| 11,951,481 | B2 * | 4/2024 | Wu | B01L 7/52 |
| 2011/0311980 | A1 | 12/2011 | Pollack et al. | |
| 2017/0241949 | A1 | 8/2017 | Bort et al. | |
| 2018/0095067 | A1 | 4/2018 | Huff et al. | |
| 2019/0060923 | A1 | 2/2019 | Yi et al. | |
| 2021/0060556 | A1 * | 3/2021 | Yao | B01L 3/502715 |
| 2021/0197163 | A1 * | 7/2021 | Geng | B01L 3/502792 |
| 2022/0403306 | A1 * | 12/2022 | Fan | G01N 1/38 |

* cited by examiner

DEVICES AND METHODS FOR FLUID ACTUATION

CROSS-REFERENCE TO RELATED APPLICATIONS

This application claims the benefit of International Patent Application No. PCT/US2020/035934, filed on Jun. 3, 2020, which claims benefit to U.S. Provisional Patent Application No. 62/856,584, filed on Jun. 3, 2019, which are incorporated by reference herein in their entirety.

BACKGROUND

Field of the Disclosed Subject Matter

The disclosed subject matter relates to devices, systems and methods for fluid actuation, for example in an integrated device for performing analyte analysis.

Description of Related Art

Analytical devices often require manipulation of samples, for example biological fluids, to prepare and analyze discrete volumes of the samples. Digital microfluidics allows for manipulation of discrete volumes of fluids, including electrically moving, mixing, and splitting droplets of fluid disposed in a gap between two surfaces, at least one of the surfaces of which includes an electrode array coated with a hydrophobic and/or a dielectric material. In addition, digital microfluidics allows for accurate and precise yet sensitive analyses using minute samples that can be analyzed quickly and with minimal instrumentation.

Digital microfluidics can be used for sample preparation, for example and without limitation, to prepare a fluid sample for analysis. A sample preparation module can include a plurality of electrodes used to manipulate fluid droplets of samples and reagents. Such samples and reagents can be contained in reservoirs as part of the integrated device, from which predetermined volumes can be dispensed from the reservoir to the device surface when needed for sample preparation or analysis. However, dispensing predetermined volumes of fluid from the reservoir can be a challenge, as volumes of fluid dispensed from the reservoir can be inconsistent or inaccurate. Moreover, as the volume of fluid remaining in the reservoir reduces as fluid droplets are dispensed therefrom, the volume of further fluid droplets dispensed from the reservoir can be increasingly inconsistent or inaccurate. In some cases, some remainder of the fluid in the reservoir can be unable to be urged from the reservoir, at least without manual intervention, which can lead to waste.

As such, there remains a need for improvement of such devices and systems. Such improvements include a reservoir configured to improve reliability of droplet dispensing from the reservoir and/or to allow most or all of the fluid in the reservoir to be dispensed.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a system for storing and dispensing liquid in a digital microfluidic chip. The system generally includes a plurality of reservoir electrodes defining a reservoir having an outlet and a first end opposite the outlet. The reservoir is configured to be in fluidic communication with at least one device electrode proximate the outlet. The at least one device electrode and at least one of the plurality of reservoir electrodes are configured to generate electrical actuation forces to dispense at least one droplet from the reservoir through the outlet to the at least one device electrode. The plurality of reservoir electrodes include a first reservoir electrode proximate the first end, a reservoir outlet electrode proximate the outlet, and at least one intermediate reservoir electrode disposed between the first reservoir electrode and the reservoir outlet electrode. The first reservoir electrode, the reservoir outlet electrode, and the at least one intermediate reservoir electrode each has an electrode surface area in plan view greater than or equal to an electrode surface area of each of the at least one device electrodes.

The reservoir can be configured to store a parent fluid volume, and the at least one device electrode and at least one of the plurality of reservoir electrodes can be configured to generate opposing electrical actuation forces on at least a portion of the parent fluid volume to dispense the at least one droplet from the parent fluid volume. Additionally or alternatively, the plurality of reservoir electrodes can be configured to generate allied electrical actuation forces to urge the parent fluid volume toward the outlet to allow substantially all of the parent fluid volume to be dispensed through the outlet.

The plurality of reservoir electrodes can be individually controllable. The system can include a controller configured to activate a first arrangement of the plurality of reservoir electrodes to dispense through the outlet a first child droplet from a parent fluid volume in the reservoir when the parent fluid volume has a first volume, and configured to activate a second arrangement of the plurality of reservoir electrodes to dispense a second child droplet from the parent fluid volume when the parent fluid volume has a second volume less than the first volume. The first arrangement of the plurality of reservoir electrodes can include the first reservoir electrode, the reservoir outlet electrode, and the at least one intermediate electrode, and the second arrangement of the plurality of reservoir electrodes can consist essentially of the reservoir outlet electrode and the at least one intermediate electrode.

Additionally or alternatively, and as embodied herein, at least two of the plurality of reservoir electrodes can be interdigitated. The system can further include a bridge electrode between the at least one device electrode and the reservoir outlet electrode. The reservoir can be configured to store at least one of a sample, wash buffer, binding member, enzyme substrates, waste fluid, or reagents. The reservoir can have a volume within a range between 2 μL and 25 μL.

The disclosed subject matter also includes a digital microfluidic and analyte detection device. The device generally includes a first substrate and a second substrate aligned generally parallel to each other with a gap defined therebetween in side view. At least one of the first substrate and the second substrate have a plurality of reservoir electrodes defining a reservoir having an outlet and a first end opposite the outlet, the reservoir in fluidic communication with the gap. The plurality of electrodes include a first reservoir electrode proximate the first end, a reservoir outlet electrode proximate the outlet, and at least one intermediate reservoir electrode disposed between the first reservoir electrode and the reservoir outlet electrode. At least one of the first substrate and the second substrate has at least one device electrode proximate the outlet, the at least one device electrode and at least one of the plurality of reservoir electrodes configured to generate electrical actuation forces to dispense at least one droplet from the reservoir through the outlet to the at least one device electrode. The first reservoir electrode, the reservoir outlet electrode, and the at least one intermediate reservoir electrode each has an electrode surface area in plan view greater than or equal to an electrode surface area of each of the at least one device electrodes.

The plurality of reservoirs can include any of the features described herein. Additionally or alternatively, the at least one device electrode can include a plurality of device electrodes defining a device array. The plurality of the reservoirs can be disposed about a peripheral region of the device array.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the disclosed subject matter. Together with the description, the drawings serve to explain the principles of the disclosed subject matter.

DESCRIPTION

Figure 1A:
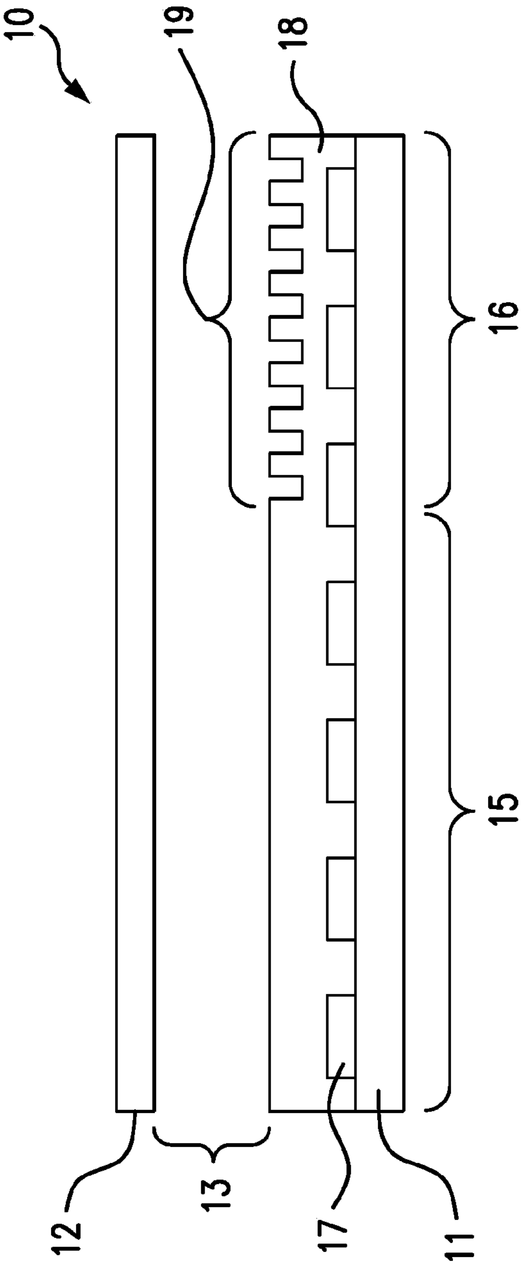
FIG. 1A is a schematic side view of an exemplary analyte detection module of an integrated digital microfluidic and analyte detection device in accordance with the disclosed subject matter.

Reference will now be made in detail to the various exemplary embodiments of the disclosed subject matter, exemplary embodiments of which are illustrated in the accompanying drawings. The structure and corresponding method of operation of and method of using the disclosed subject matter will be described in conjunction with the detailed description of the system.

Systems, devices, and method described herein relate to fluid actuation, including in an integrated digital microfluidic and analyte detection device. As used interchangeably herein, "digital microfluidics (DMF)," "digital microfluidic module (DMF module)," or "digital microfluidic device (DMF device)" refer to a module or device that utilizes digital or droplet-based microfluidic techniques to provide for manipulation of discrete and small volumes of liquids in the form of droplets. Digital microfluidics uses the principles of emulsion science to create fluid-fluid dispersion into channels (e.g., water-in-oil emulsion), and thus can allow for the production of monodisperse drops or bubbles or with a very low polydispersity. Digital microfluidics is based upon the micromanipulation of discontinuous fluid droplets within a reconfigurable network. Complex instructions can be programmed by combining the basic operations of droplet formation, translocation, splitting, and merging.

Digital microfluidics operates on discrete volumes of fluids that can be manipulated by binary electrical signals. By using discrete unit-volume droplets, a microfluidic operation can be defined as a set of repeated basic operations, e.g., moving one unit of fluid over one unit of distance. Droplets can be formed using surface tension properties of the liquid. Actuation of a droplet is based on the presence of electrostatic forces generated by electrodes placed beneath the bottom surface on which the droplet is located. Different types of electrostatic forces can be used to control the shape and motion of the droplets. One technique that can be used to create the foregoing electrostatic forces is based on dielectrophoresis, which relies on the difference of electrical permittivities between the droplet and surrounding medium and can utilize high-frequency AC electric fields. Another technique that can be used to create the foregoing electrostatic forces is based on electrowetting, which relies on the dependence of surface tension between a liquid droplet present on a surface and the surface on the electric field applied to the surface.

As used herein, "sample," "test sample," or "biological sample" refer to a fluid sample containing or suspected of containing an analyte of interest. The sample can be derived from any suitable source. As embodied herein, the sample can comprise a liquid, fluent particulate solid, or fluid suspension of solid particles. As embodied herein, the sample can be processed prior to the analysis described herein. For example, the sample can be separated or purified from a source prior to analysis; however, as embodied herein, an unprocessed sample containing the analyte can be assayed directly. The source of the analyte molecule can be synthetic (e.g., produced in a laboratory), the environment (e.g., air, soil, fluid samples, e.g., water supplies, etc.), an animal (e.g., a mammal, reptile, amphibian or insect), a plant, or any combination thereof. For example and without limitation, as embodied herein, the source of an analyte is a human bodily substance (e.g., bodily fluid, blood, serum, plasma, urine, saliva, sweat, sputum, semen, mucus, lacrimal fluid, lymph fluid, amniotic fluid, interstitial fluid, lung lavage, cerebrospinal fluid, feces, tissue, organ, or the like). Tissues can include, but are not limited to skeletal muscle tissue, liver tissue, lung tissue, kidney tissue, myocardial tissue, brain tissue, bone marrow, cervix tissue, skin, etc. The sample can be a liquid sample or a liquid extract of a solid sample. In certain cases, the source of the sample can be an organ or tissue, such as a biopsy sample, which can be solubilized by tissue disintegration or cell lysis.

As embodied herein, and as described further herein, the integrated digital microfluidic and analyte detection device can have two modules: a sample preparation module and an analyte detection module. As embodied herein, the sample preparation module and the analyte detection module are separate or separate and adjacent. As embodied herein, the sample preparation module and the analyte detection module are co-located, comingled or interdigitated. The sample preparation module can include a plurality of electrodes for moving, merging, diluting, mixing, separating droplets of samples and reagents. The analyte detection module (or "detection module") can include a well array in which an analyte related signal is detected. As embodied herein, the detection module can also include the plurality of electrodes for moving a droplet of prepared sample to the well array. As embodied herein, the detection module can include a well array in a first substrate (e.g., upper substrate) which is disposed over a second substrate (e.g., lower substrate) separated by a gap. In this manner, the well array is in an upside-down orientation. As embodied herein, the detection module can include a well array in a second substrate (e.g., lower substrate) which is disposed below a first substrate (e.g., upper substrate) separated by a gap. As embodied herein, the first substrate and the second substrate are arranged to face each other. A droplet can be urged (e.g., by electrical actuation) to the well array using electrode(s) present in the first substrate and/or the second substrate. As embodied herein, the well array including the region in between the wells can be hydrophobic. Alternatively, the plurality of electrodes can be limited to the sample preparation module and a droplet of prepared sample (and/or a droplet of immiscible fluid) can be moved to the detection module using other means.

Droplet-based microfluidics refer to generating and actuating (such as moving, merging, splitting, etc.) liquid droplets via active or passive forces. Examples of active forces include, but are not limited to, an electric field. Exemplary active force techniques include electrowetting, dielectrophoresis, opto-electrowetting, electrode-mediated, electric-field mediated, electrostatic actuation, and the like or a combination thereof. For example, and as described further herein, the device can actuate liquid droplets across the upper surface of the first layer (or upper surface of the second layer, when present) in the gap via droplet-based microfluidics, such as, electrowetting or via a combination of electrowetting and continuous fluid flow of the liquid droplets. Alternatively, the device can include micro-channels to deliver liquid droplets from the sample preparation module to the detection module. As a further alternative, the device can rely upon the actuation of liquid droplets across the surface of the hydrophobic layer in the gap via droplet-based microfluidics. Electrowetting can involve changing the wetting properties of a surface by applying an electrical field to the surface and affecting the surface tension between a liquid droplet present on the surface and the surface. Continuous fluid flow can be used to move liquid droplets via an external pressure source, such as an external mechanical pump or integrated mechanical micropumps, or a combination of capillary forces and electrokinetic mechanisms. Examples of passive forces include, but are not limited to, T-junction and flow focusing methods. Other examples of passive forces include use of denser immiscible liquids, such as, heavy oil fluids, which can be coupled to liquid droplets over the surface of the first substrate and displace the liquid droplets across the surface. The denser immiscible liquid can be any liquid that is denser than water and does not mix with water to an appreciable extent. For example, the immiscible liquid can be hydrocarbons, halogenated hydrocarbons, polar oil, non-polar oil, fluorinated oil, chloroform, dichloromethane, tetrahydrofuran, 1-hexanol, etc.

In accordance with an aspect of the disclosed subject matter, a system for storing and dispensing liquid in a digital microfluidic chip is provided. The system generally includes a plurality of reservoir electrodes defining a reservoir having an outlet and a first end opposite the outlet. The reservoir is configured to be in fluidic communication with at least one device electrode proximate the outlet. The at least one device electrode and at least one of the plurality of reservoir electrodes are configured to generate electrical actuation forces to dispense at least one droplet from the reservoir through the outlet to the at least one device electrode. The plurality of reservoir electrodes include a first reservoir electrode proximate the first end, a reservoir outlet electrode proximate the outlet, and at least one intermediate reservoir electrode disposed between the first reservoir electrode and the reservoir outlet electrode. The first reservoir electrode, the reservoir outlet electrode, and the at least one intermediate reservoir electrode each has an electrode surface area in plan view greater than or equal to an electrode surface area of each of the at least one device electrodes.

The accompanying figures, where like reference numerals refer to identical or functionally similar elements throughout the separate views, serve to further illustrate various embodiments and to explain various principles and advantages all in accordance with the disclosed subject matter. For purpose of explanation and illustration, and not limitation, exemplary embodiments of the system for storing and dispensing liquid in a digital microfluidic chip, including in a digital microfluidic and analyte detection device, in accordance with the disclosed subject matter are shown in FIGS. 1A-4C.

FIG. 1A illustrates an exemplary analyte detection module of an integrated digital microfluidic and analyte detection device 10. The device 10 includes an analyte detection module including a first substrate 11 and a second substrate 12, where the second substrate 12 is aligned generally parallel to the first substrate with a gap 13 therebetween. As embodied herein, the second substrate 12 can be positioned over the first substrate 11, or alternatively, the second substrate 12 can be positioned below the first substrate 11. As used throughout, the terms "proximal" in view of "distal" and "first" in view of "second" are relative terms for point of reference only and are interchangeable with respect to each other. As illustrated in FIG. 1A, the second substrate 12 can be the same length as the first substrate 11. Alternatively, the first substrate 11 and the second substrate 12 can be of different lengths.

At least one of the first substrate 11 and the second substrate 12 includes an electrode array defined therein. For example and without limitation, and as embodied herein, the first substrate 11 can include a plurality of electrodes positioned on the upper surface of the first substrate 11 to define the electrode array. The electrode array, for example and without limitation electrode array 1049 or 318 shown in FIGS. 2-3 and discussed further herein, is configured to generate electrical actuation forces to urge at least one droplet along the at least one of the first substrate 11 and second substrate 12, as discussed further herein. Although the plurality of electrodes 17 are depicted in the first substrate 11, devices in accordance with the disclosed subject matter can have electrodes in either the first substrate 11, the second substrate 12, or in both of the first and second substrates.

Referring still to FIG. 1A, the device 10 can include a first portion 15, where liquid droplet, such as, a sample droplet, reagent droplet, etc., can be introduced onto at least one of the first substrate 11 and second substrate 12. The device 10 can include a second portion 16, towards which a liquid droplet can be urged. The first portion 15 can also be referred to as the sample preparation module and the second portion 16 can be referred to as the analyte detection module. For example, liquid can be introduced into the gap 13 via a droplet actuator (not illustrated). Alternatively, liquid can be into the gap via a fluid inlet, port, or channel. As discussed further herein, for example with respect to FIG. 2, the device 10 can include chambers for holding sample, wash buffers, binding members, enzyme substrates, waste fluid, etc. Assay reagents can be contained in external reservoirs as part of the integrated device, where predetermined volumes can be urged from the reservoir to the device surface when needed for specific assay steps. Additionally, assay reagents can be deposited on the device in the form of dried, printed, or lyophilized reagents, where they can be stored for extended periods of time without loss of activity. Such dried, printed, or lyophilized reagents can be rehydrated prior or during analyte analysis.

With further reference to FIG. 1A, a layer 18 of dielectric/hydrophobic material can be disposed on the upper surface of the first substrate. For example and not limitation, and as embodied herein, Teflon can be used as both the dielectric and hydrophobic material. However, any suitable material having dielectric and hydrophobic properties can be used, as described further herein. The layer 18 can cover the plurality of electrodes 17 in the electrode array. Alternatively, and shown for example in the exemplary device depicted in FIG. 1B, a layer 38 of dielectric material can be disposed on the upper surface of the first substrate and covering the plurality of electrodes 17 of the electrode array. A layer 34 of hydrophobic material can be overlaid on the dielectric layer 38. In this manner, any suitable combination of materials having dielectric and hydrophobic properties can be used to form layer 38 and layer 34, respectively, as described further herein.

Figure 1B:
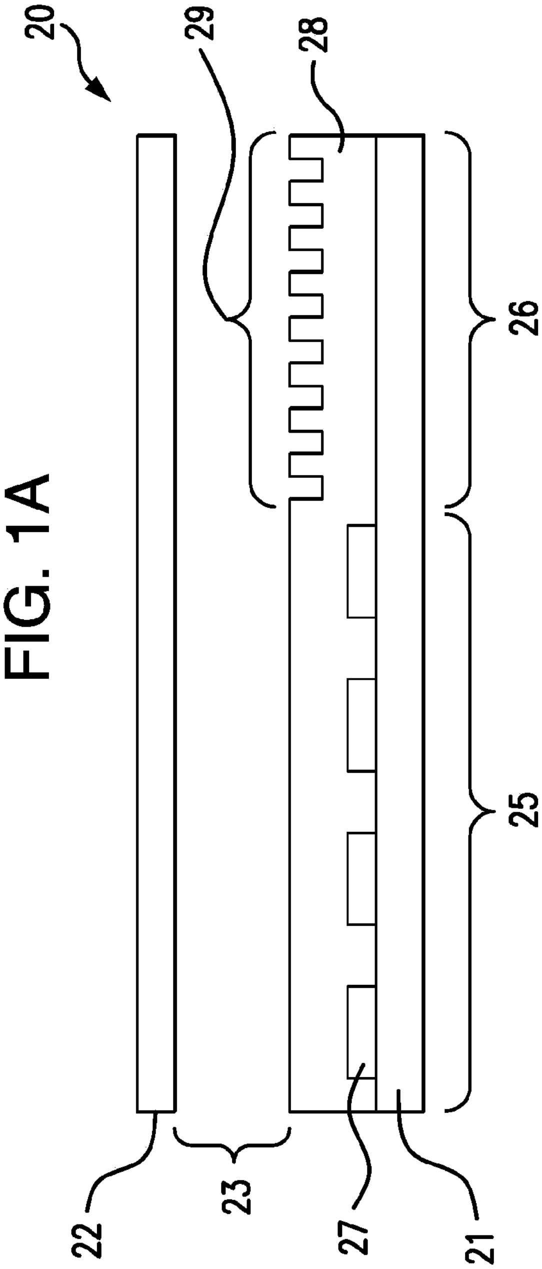
FIG. 1B is a schematic side view of another exemplary analyte detection module of an integrated digital microfluidic and analyte detection device in accordance with the disclosed subject matter.

At least one of the first substrate 11 and the second substrate 12 has a well array 19. For example and without limitation, and with reference to FIG. 1A, the well array 19 can be positioned in the layer 18 of the first substrate 11 in the second portion 16 of the device. With reference to FIG. 1B, the well array 19 can alternatively be positioned in the layer 34. While reference is made herein to the well array 19 in the first substrate 11, the well array 19 can be positioned on either the first substrate 11, the second substrate 12, or on both of the first and second substrates. As embodied herein, the plurality of electrodes 17 and the well array 19 can be defined in the same one of the first substrate or the second substrate. Alternatively, the plurality of electrodes 17 and the well array 19 can be defined in different substrates.

The first and second substrates can be made from a flexible material, such as paper (with ink jet-printed electrodes) or polymers, such as PET or PMMA. Alternatively, the first and second substrates can be made from a non-flexible material, such as for example, printed circuit board, plastic or glass or silicon. For purpose of illustration and not limitation, as embodied herein, one or both of the substrates can be made from a single sheet, which can undergo subsequent processing to create the plurality of electrodes. As embodied herein, one or more sets of the plurality of electrodes can be fabricated on a substrate which can be cut to form a plurality of substrates overlaid with a plurality of electrodes. For example and not limitation, the electrodes can be bonded to the surface of the conducting layer via a general adhesive agent or solder.

The electrodes can be comprised of a metal, metal mixture or alloy, metal-semiconductor mixture or alloy, or a conductive polymer. Some examples of metal electrodes include copper, gold, indium, tin, indium tin oxide, and aluminum. For example, the dielectric layer comprises an insulating material, which has a low electrical conductivity or is capable of sustaining a static electrical field. For example, the dielectric layer can be made of porcelain (e.g., a ceramic), polymer or a plastic. The hydrophobic layer can be made of a material having hydrophobic properties, such as, for example, Teflon and generic fluorocarbons. In another example, the hydrophobic material can be a fluorosurfactant (e.g., FluoroPel). In embodiments including a hydrophilic layer deposited on the dielectric layer, the hydrophilic layer can be a layer of glass, quartz, silica, metallic hydroxide, or mica.

The plurality of electrodes can include a certain number of electrodes per unit area of the first substrate, which number can be increased or decreased based on size of the electrodes and a presence or absence of inter-digitated electrodes. Electrodes can be fabricated using a variety of processes including, photolithography, atomic layer deposition, laser scribing or etching, laser ablation, flexographic printing and ink-jet printing of electrodes. For example and not limitation, a special mask pattern can be applied to a conductive layer disposed on an upper surface of the first substrate followed by laser ablation of the exposed conductive layer to produce a plurality of electrodes on the first substrate.

Figure 2:
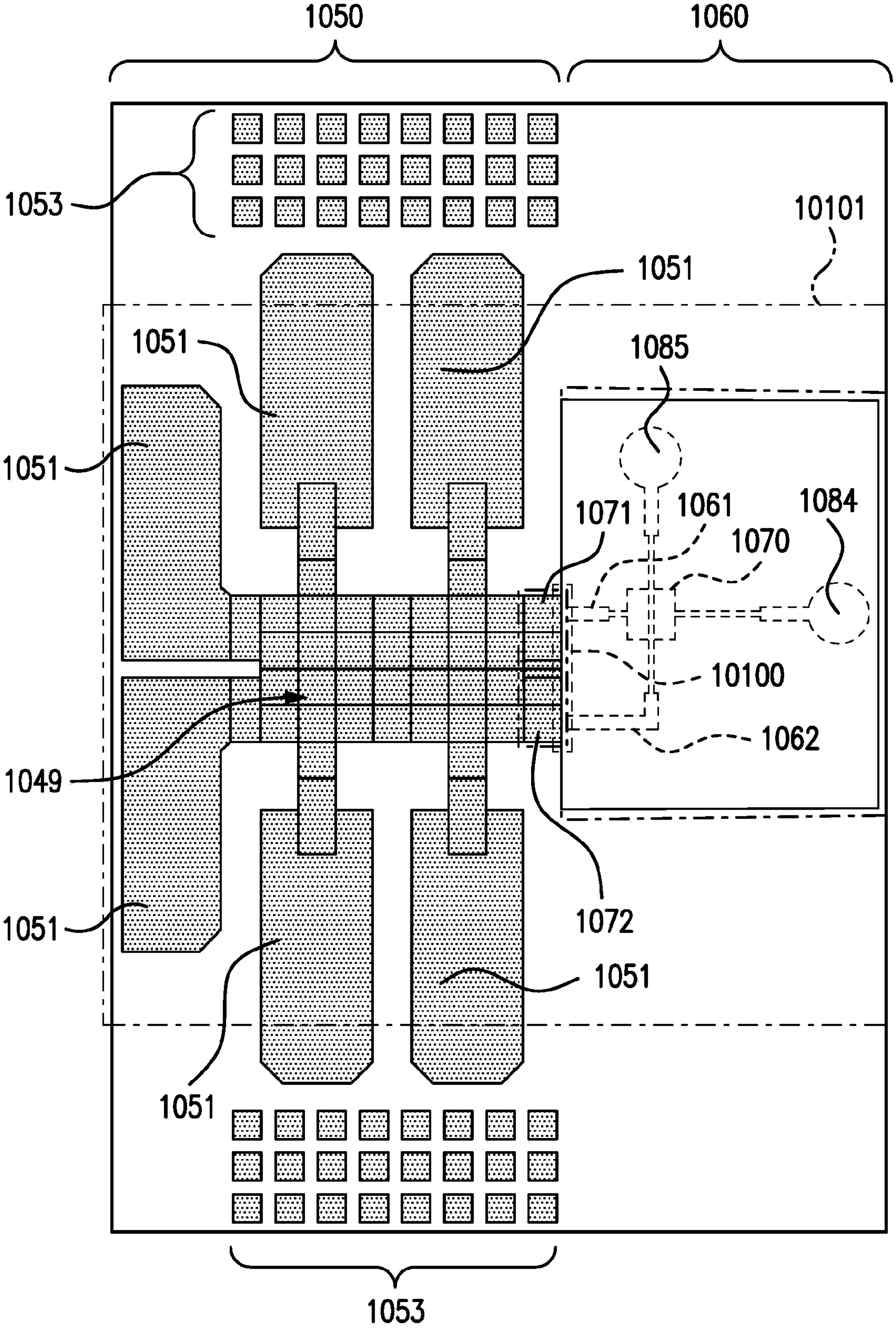
FIG. 2 is a plan view of an exemplary embodiment of an integrated digital microfluidic and analyte detection device in accordance with the disclosed subject matter.

FIG. 2 is a plan view of an exemplary embodiment of an integrated digital microfluidic and analyte detection device in accordance with the disclosed subject matter. The digital microfluidics module is depicted with a plurality of electrodes forming an array of electrodes 1049 that are operatively connected to a plurality of reservoirs 1051. The plurality of reservoirs 1051 can be used for generation of droplets, as described herein, to be transported to an analyte detection module 1060. For example, one or more of the reservoirs 1051 can contain a reagent or a sample. Different reagents can be present in different reservoirs. Also depicted in the microfluidics module 1050 are contact pads 1053 that connect the array of electrodes 1049 to a power source (not shown). Trace lines connecting the array of electrodes 1049 to the contact pads are not depicted. The array of electrodes 1049 can transport one or more droplets, for example and not limitation, a buffer droplet or a droplet containing a buffer and/or a tag (such as and without limitation, a cleaved tag or dissociated aptamer) to the analyte detection module 1060. The analyte detection module 1060 can be any module for detecting analytes, for example and not limitation, a single-molecule detection module, such as a nanowell module or a nanopore module. Additional details and examples of analyte detection modules for use with the disclosed subject matter are described in U.S. Patent Application Publication No. 2018/0095067, which is incorporated by reference herein in its entirety.

For example and as embodied herein, the electrical potential generated by the plurality of electrodes urge liquid droplets, formed on an upper surface of the first layer (or the second layer when present) covering the plurality of electrodes, across the surface of the digital microfluidic device to be received by the well array. In this manner, each electrode can independently urge the droplets across the surface of the digital microfluidic device.

Figure 3:
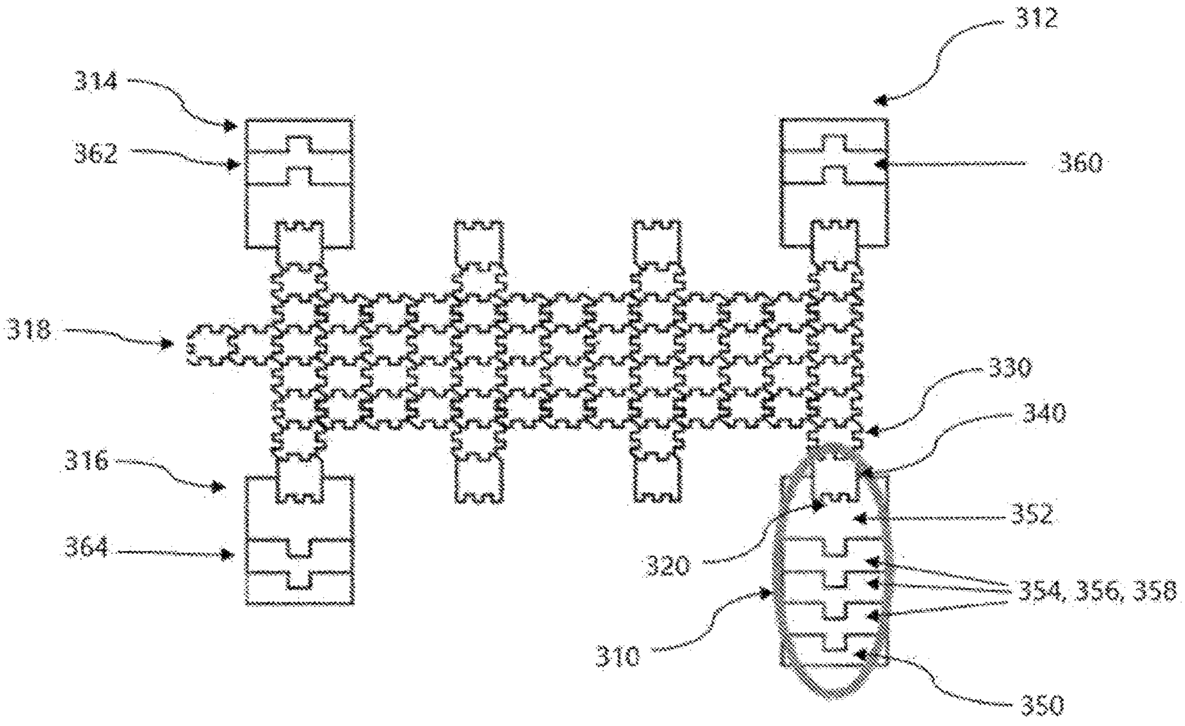
FIG. 3 is a plan view of an exemplary embodiment of an integrated digital microfluidic and analyte detection device, having an exemplary split reservoir configuration in accordance with the disclosed subject matter.

FIG. 3 illustrates the digital microfluidics module with an exemplary split reservoir configuration for storing and dispensing liquid in a digital microfluidic chip according to the disclosed subject matter. For purpose of illustration and not limitation, as embodied herein, the digital microfluidics module can include reservoirs 310, 312, 314, 316, which can include any of the features of reservoirs 1051 shown in FIG. 2, and an array of electrodes 318, which can include any of the features of array of electrodes 1049 shown in FIG. 2. With reference to FIG. 3, for example and without limitation, the reservoir 310 includes an outlet 320 through which liquid can be dispensed from the reservoir 310 to the area of the array of electrodes 318. The outlet 320 can be joined to and configured to be in fluidic communication with device electrode 330 of the array of electrodes 318, for example and as embodied herein, via a bridge electrode 340.

For purpose of illustration and not limitation, and as embodied herein, the reservoir 310 can include a first reservoir electrode 350, a reservoir outlet electrode 352, and intermediate reservoir electrodes 354, 356, 358. The first reservoir electrode 350 can be disposed proximate a first end of the reservoir 310 opposite the reservoir outlet electrode 352. The reservoir outlet electrode 352 can be disposed proximate the outlet 320. The intermediate reservoir electrodes 354, 356, 358 can be disposed between the first reservoir electrode 350 and the reservoir outlet electrode 352. The reservoir can include any number of intermediate reservoir electrodes in accordance with the disclosed subject matter. For example and without limitation, the reservoir can include a plurality of intermediate reservoir electrodes, such as two, three, four, or more electrodes, as shown for purpose of illustration by reservoir 310 having three intermediate reservoir electrodes 354, 356, 358. Alternatively, a reservoir can include one intermediate reservoir electrode, as shown for purpose of illustration by reservoirs 312, 314, 316 each having an intermediate reservoir electrode 360, 362, 364, respectively. Each or any combination of the first reservoir electrode 350, the reservoir outlet electrode 352, and the intermediate reservoir electrodes 354, 356, 358 can be configured to generate electrical actuation forces to dispense at least one droplet of liquid from the reservoir 310 through the outlet 320.

For purpose of illustration and not limitation, and as embodied herein, the first reservoir electrode 350, the reservoir outlet electrode 352, and the intermediate reservoir electrodes 354, 356, 358 each has an electrode surface area in plan view greater than or equal to an electrode surface area of each device electrode 330. Additionally or alternatively, and as embodied herein, the first reservoir electrode 350, the reservoir outlet electrode 352, and the intermediate reservoir electrodes 354, 356, 358 together define a substantially constant width of the reservoir 310 from the first end to the outlet 320. As shown for example in FIG. 3, the first reservoir electrode 350 can have a first reservoir electrode area, and each of the intermediate reservoir electrodes 354, 356, 358 can have an intermediate reservoir electrode area that is substantially equal to the first reservoir electrode area. The reservoir outlet electrode 352 can have a reservoir outlet electrode area greater than the first reservoir electrode area of the first reservoir electrode 350. In addition, the reservoir outlet electrode 352 can have a reservoir outlet electrode area that is greater than or equal to an area of the device electrode 330. The bridge electrode 340 can be disposed between the device electrode 330 and the reservoir outlet electrode 352.

For purpose of illustration and not limitation, as shown for example in FIG. 3, the first reservoir electrode 350, the reservoir outlet electrode 352, and the intermediate reservoir electrodes 354, 356, 358 are interdigitated. As embodied herein, the reservoir 310 is configured to store at least one of a sample, wash buffer, binding member, enzyme substrates, waste fluid, or reagents. The volume of reservoir 310 can be configured to provide suitable volume of the fluid stored in the reservoir 310 for the particular assay or application for which the reservoir 310 will be used. For purpose of illustration and not limitation, reservoir 310 can have a volume within a range between approximately 5 μL and approximately 25 μL. Alternatively, reservoir 310 can have a volume within a range between approximately 2 μL and approximately 15 μL. Substrates with increased rigidity can be used to define reservoirs having larger volumes.

The reservoir 310 can configured to store a liquid droplet to be transported through the bridge electrode 340 to the device electrode 330. As discussed herein, the reservoir 310 can contain a reagent or a sample. For purpose of illustration and not limitation, and as embodied herein, the reservoir 310 can be configured to store a volume of fluid (which can be referred to as a "parent fluid volume") from which a plurality of discrete volumes of fluid (which can be referred to as "child droplets") can be dispensed from the reservoir 310.

Figure 4A:
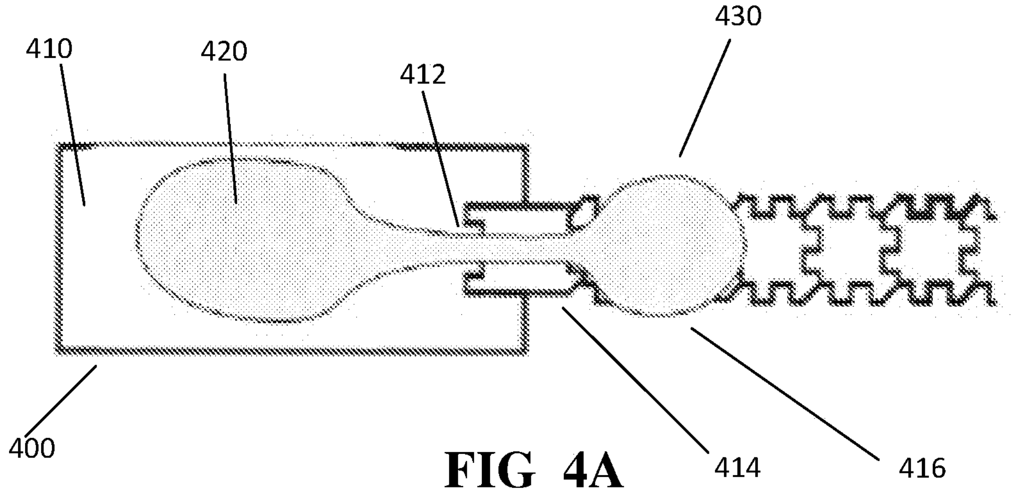
FIG. 4A is a schematic illustrating a liquid droplet being dispensed from an exemplary reservoir having a single-electrode reservoir configuration for purpose of illustration and comparison with the disclosed subject matter.
Figure 4B:
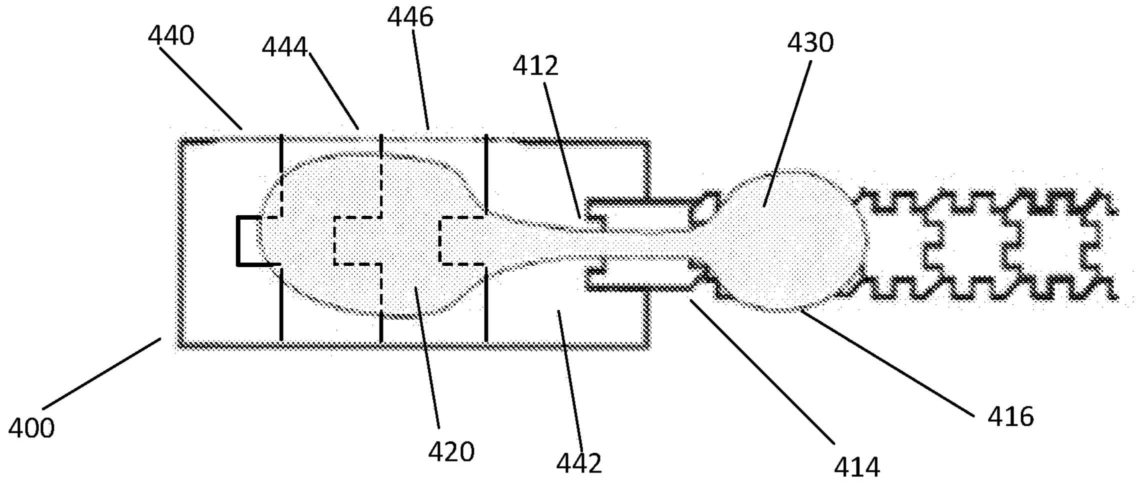
FIG. 4B is a schematic illustrating operation of an exemplary split reservoir to dispense a liquid droplet in accordance with the disclosed subject matter.
Figure 4C:
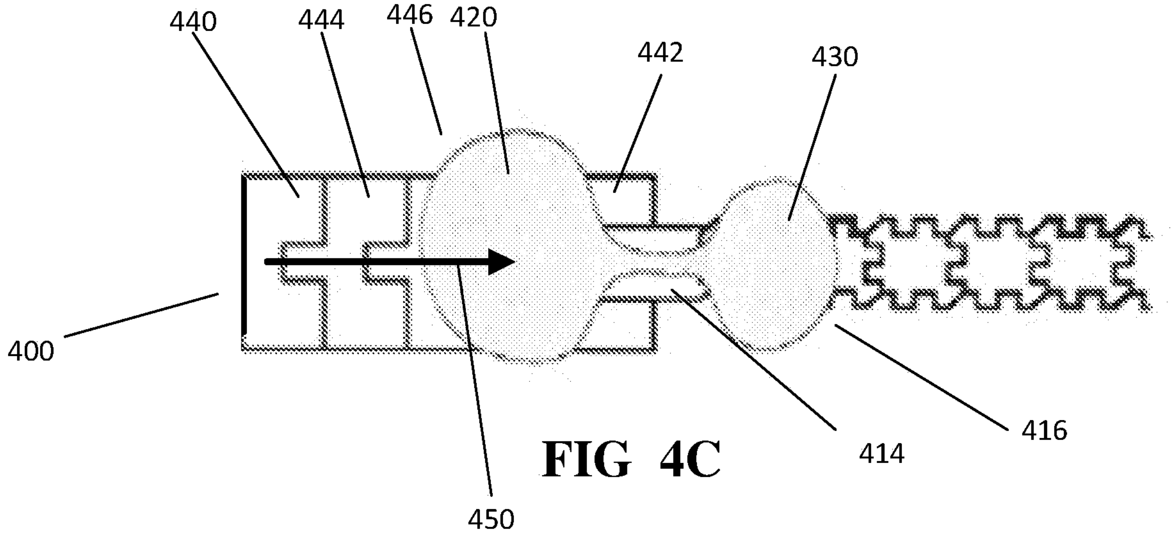
FIG. 4C is a schematic illustrating additional details of the operation of the exemplary split reservoir of FIG. 4B.

For example and not limitation, FIGS. 4A-4C illustrate the operation of a liquid droplet being dispensed from an exemplary reservoir having a single-electrode reservoir configuration (FIG. 4A) for purpose of illustration and comparison with an exemplary split reservoir configuration (FIGS. 4B and 4C) in accordance with the disclosed subject matter. As shown for example in FIG. 4A, the reservoir 400 includes a single reservoir electrode 410, an outlet 412, a bridge electrode 414, and at least one device electrode 416 (shown beneath the child droplet 430 in plan view). As discussed herein, discrete volumes of fluids can be dispensed from the reservoir 400 by electrical actuation.

For purpose of illustration and not limitation, as embodied herein, a parent fluid volume 420 is disposed in the reservoir 400, and a child droplet 430 can be separated from the parent fluid volume 420 and urged by electrical actuation of the reservoir electrode 410 through the outlet 412 and across the bridge electrode 414 to the device electrode 416. For example, the reservoir electrode 410 can be activated to urge the parent fluid volume 420 toward the outlet 412, and a portion of the parent fluid volume 420 can form a liquid tail 422 extending through the outlet 412 and across the bridge electrode 414 to the device electrode 416. As embodied herein, when the liquid tail 422 formed from the parent fluid volume 420 extends to and accumulates liquid on the device electrode 416, the device electrode 416 can be activated, for example and as embodied herein, concurrently with the reservoir electrode 410. The bridge electrode 414 can remain deactivated, and thus, electrical forces generated by the reservoir electrode 410 and the device electrode 416 can be applied to the parent fluid volume 420 in opposite directions proximate bridge electrode 414 such that the the parent fluid volume 420 extending through the outlet 412 is separated from the remainder of the parent fluid volume 420 proximate a pinch-off location 424 to dispense the child droplet 430 onto device electrode 416. In this manner, the reservoir electrode 410 and the device electrode 416 can be configured to generate opposing electrical actuation forces to dispense the child droplet 430 from the parent fluid volume 420.

As embodied herein, the pinch-off location 424 can be proximate the center of the bridge electrode 414. However, as the liquid amount of the parent fluid volume 420 decreases as child droplets are dispensed therefrom, the amount of liquid urged through the outlet 412 can become inconsistent, due at least in part to irregular liquid tail formations or unpredictable pinch-off locations. For example and without limitation, and as embodied herein, as the parent fluid volume 420 decreases in volume as child droplets 430 are formed therefrom, longer liquid tails 422 can form, which can shift the pinch-off location 424 away from the center of the bridge electrode, as shown for example in FIG. 4A, and can result in formation of child droplets 430 having a reduced or otherwise inconsistent volume.

For purpose of illustration and not limitation, FIGS. 4B and 4C show a liquid droplet being dispensed from an exemplary reservoir having a split reservoir configuration in accordance with the disclosed subject matter. With reference to FIG. 4B, as embodied herein, reservoir 400 includes a first reservoir electrode 440, a reservoir outlet electrode 442, and intermediate reservoir electrodes 444, 445, the outlet 414, the bridge electrode 414, and the device electrode 416 (shown beneath the child droplet 430 in plan view). As embodied herein, the parent fluid volume 420 is disposed in the reservoir 400 and can be manipulated by electrical actuation of one or more of the first reservoir electrode 440, the intermediate reservoir electrodes 444, 445, and the reservoir outlet electrode 442.

For example and not limitation, as embodied herein, child droplet 430 can be separated from the parent fluid volume 420 and urged by electrical actuation of one or more of the first reservoir electrode 440, the intermediate reservoir electrodes 444, 445 and the reservoir outlet electrode 442 through the outlet 412 and the bridge electrode 414 to the device electrode 416. For example and not limitation, one or more of the first reservoir electrode 440, the intermediate reservoir electrodes 444, 445 and the reservoir outlet electrode 442 can be activated to urge the parent fluid volume 420 toward the outlet 412, and a portion of the parent fluid volume 420 can be urged to form a liquid tail 422 extending through the outlet 412 and across the bridge electrode 414 to the device electrode 416. As embodied herein, when the liquid tail 422 formed from the parent fluid volume 420 extends to and accumulates liquid on the device electrode 416, the device electrode 416 can be activated, for example and as embodied herein, concurrently with one or more of the first reservoir electrode 440, the intermediate reservoir electrodes 444, 445 and the reservoir outlet electrode 442. The bridge electrode 414 can remain deactivated, and thus, electrical forces generated by the one or more of the first reservoir electrode 440, the intermediate reservoir electrodes 444, 445 and the reservoir outlet electrode 442 and the device electrode 416 can be applied to the parent fluid volume 420 in opposite directions such that the portion of the parent fluid volume 420 extending through the outlet 412 is separated from the remainder of the parent fluid volume 420 proximate pinch-off location 424 to dispense the child droplet 430 onto device electrode 416. In this manner, one or more of the reservoir outlet electrode 442, the intermediate reservoir electrodes 444, 445, the first reservoir electrode 440 and the device electrode 416 can be configured to generate opposing electrical actuation forces to dispense the child droplet 430 from the parent fluid volume 420.

Referring now to FIG. 4C, with parent fluid volume 420 having a reduced volume from an initial volume, the device electrode 416 and one or more of the first reservoir electrode 440, the reservoir outlet electrode 442, and the intermediate reservoir electrodes 444, 446 can be configured to generate allied electrical actuation forces to urge the parent fluid volume 420 toward the outlet 412 to allow child droplets 430 to be dispensed from substantially all of the parent fluid volume 420. The first reservoir electrode 440, the reservoir outlet electrode 442, and each of the intermediate reservoir electrodes 444, 446 can be individually controllable. As shown for example in FIG. 4C, for example and not limitation, while dispensing child droplets 430 from the parent fluid volume 420, a portion of the parent fluid volume 420 may be disposed proximate a first end 411 or proximal end of the reservoir 400 opposite the outlet 412. As embodied herein, one or more of the first reservoir electrode 440, the reservoir outlet electrode 442, and the intermediate reservoir electrodes 444, 446 can be configured to actuate individually or together in different arrangements to generate allied electrical actuation forces to urge the parent fluid volume 420 in direction 450 from first end 411 toward the outlet 412. In this manner, the position of the parent fluid volume 420 can be shifted relative to the outlet 412 to reduce the length of liquid tail 422 formed and shift pinch-off location 424 toward the center of bridge electrode 414, which can provide a consistent pinch-off location to dispense child droplets 430 of consistent size from the parent fluid volume 420, as described herein, regardless of the volume of the parent fluid volume 420.

For purpose of illustration and not limitation, a controller associated with the digital microfluidics module 1050 can be configured to individually control and activate the electrodes described herein, for example and without limitation as described in more detail in U.S. Patent Application Publication No. 2018/0095067, which is incorporated by reference herein in its entirety. For example and not limitation, with reference to FIGS. 4B and 4C, the controller can be configured to activate a first arrangement of the plurality of reservoir electrodes when the parent fluid volume 420 has a first volume. For example, and as embodied herein, the first arrangement of reservoir electrodes can be the first reservoir electrode 440, the reservoir outlet electrode 442, and the intermediate reservoir electrodes 444,446. The first volume can refer to an initial volume of the parent fluid volume before any child droplets are dispensed, or can refer to a volume of the parent fluid volume that is sufficient for dispensing child droplets of a predetermined volume from the parent fluid volume using the first arrangement of the plurality of reservoir electrodes. As such, the first arrangement of reservoir electrodes can be configured to dispense the child droplet 430 from the parent fluid volume 420 as described herein.

Additionally or alternatively, and as embodied herein, the controller can be configured to activate a second arrangement of the plurality of reservoir electrodes when the parent fluid volume 420 has a second volume less than the first volume. For example, and as embodied herein, the second arrangement of reservoir electrodes can be the reservoir outlet electrode 442, and one or more of the intermediate reservoir electrodes 444, 446. The second volume can refer to any volume of the parent fluid volume less than the first volume, and can refer to a volume of the parent fluid volume that is less than a volume sufficient for dispensing child droplets of a predetermined volume from the parent fluid volume using the first arrangement of the plurality of reservoir electrodes. In addition, or as a further alternative, the parent fluid volume 420 having the second volume can be reduced in volume such that the parent fluid volume 420 is no longer disposed in the area of one or more of the first reservoir electrode 440 and the intermediate reservoir electrodes 444, 446. The second arrangement of the plurality of reservoir electrodes can thus include the reservoir outlet electrode 442, and at least one of the intermediate reservoir electrodes 444, 446, while the first reservoir electrode 440 can be turned off, along with any of intermediate reservoir electrodes 444, 446 without a portion of the parent fluid volume 420 disposed thereon.

For example and not limitation, As shown for example in FIG. 4C, the second arrangement of electrodes can be activated to urge the parent fluid volume 420 in the direction 450 from first end 411 toward the outlet 412. As embodied herein, activation of the electrodes can be sequential, with pairs of reservoir electrodes activating to urge the parent fluid volume 420 in the direction 450. For example, intermediate reservoir electrodes 444 and 446 can be activated with intermediate reservoir electrode 446 generating an electrical actuation force that acts on the parent fluid volume 420 in direction 450 and intermediate reservoir electrode 444 generating an opposing electrical actuation force. Intermediate reservoir electrode 444 can then be deactivated, which can cause the parent fluid volume 420 to move in direction 450 onto intermediate reservoir electrode 446. The reservoir outlet electrode 442 can then be activated to generate an electrical actuation force that acts on the parent fluid volume 420 in direction 450 with intermediate reservoir electrode 446 generating an opposing electrical actuation force. Intermediate electrode 446 can then be deactivated, which can cause the parent fluid volume 420 to move in direction 450 onto reservoir outlet electrode 442 proximate the outlet 412. Alternatively, the second arrangement of electrodes can be activated together or in any non-sequential combination to urge the parent fluid volume 420 toward the outlet 412. In this manner, with the parent fluid volume 420 disposed proximate the outlet, the pinch-off location 424 can be disposed proximate the center of the bridge electrode 414. As such, formation of irregular liquid tail formations, such as but not limited to longer liquid tail formations than those formed from the parent fluid volume having the first volume, can be prevented. Moreover, unpredictable pinch-off locations 424, such as but not limited to pinch-off locations spaced from the bridge electrode 414 or proximate an edge of the bridge electrode 414, can be avoided.

Additionally, and as embodied herein, reservoir electrodes no longer in contact with the parent fluid volume 420 can be turned off or disabled. That is, for example and not limitation, any or all of the first reservoir electrode 440 and the intermediate electrodes 444, 446 can be disabled if the parent fluid volume 420 is no longer disposed on or proximate these electrodes, for example due to reduced volume of the parent fluid volume 420.

In accordance with another aspect of the disclosed subject matter, a digital microfluidic and analyte detection device is provided. The device generally includes a first substrate and a second substrate aligned generally parallel to each other with a gap defined therebetween in side view. At least one of the first substrate and the second substrate have a plurality of reservoir electrodes defining a reservoir having an outlet and a first end opposite the outlet, the reservoir in fluidic communication with the gap. The plurality of electrodes include a first reservoir electrode proximate the first end, a reservoir outlet electrode proximate the outlet, and at least one intermediate reservoir electrode disposed between the first reservoir electrode and the reservoir outlet electrode. At least one of the first substrate and the second substrate has at least one device electrode proximate the outlet, the at least one device electrode and at least one of the plurality of reservoir electrodes configured to generate electrical actuation forces to dispense at least one droplet from the reservoir through the outlet to the at least one device electrode. The first reservoir electrode, the reservoir outlet electrode, and the at least one intermediate reservoir electrode each has an electrode surface area in plan view greater than or equal to an electrode surface area of each of the at least one device electrodes.

For purpose of illustration and not limitation, and as embodied herein, the digital microfluidic devices described herein can be configured as a sample preparation module combined with an analyte detection module to form a digital microfluidic and analyte detection device, for example and without limitation as described in U.S. Patent Application Publication No. 2018/0095067, which is incorporated by reference herein in its entirety.

As embodied herein, the sample preparation module can be used for performing steps of an immunoassay. Any immunoassay format can be used to generate a detectable signal which signal is indicative of presence of an analyte of interest in a sample and is proportional to the amount of the analyte in the sample.

For purpose of illustration and not limitation, and as embodied herein, the detection module includes the well array that are optically interrogated to measure a signal related to the amount of analyte present in the sample. The well array can have sub-femtoliter volume, femtoliter volume, sub-nanoliter volume, nanoliter volume, sub-microliter volume, or microliter volume. For example, the well array can be array of femtoliter wells, array of nanoliter wells, or array of microliter wells. As embodied herein, the wells in an array can all have substantially the same volume. The well array can have a volume up to 100 μl, e.g., about 0.1 femtoliter, 1 femtoliter, 10 femtoliter, 25 femtoliter, 50 femtoliter, 100 femtoliter, 0.1 pL, 1 pL, 10 pL, 25 pL, 50 pL, 100 pL, 0.1 nL, 1 nL, 10 nL, 25 nL, 50 nL, 100 nL, 0.1 microliter, 1 microliter, 10 microliter, 25 microliter, 50 microliter, or 100 microliter.

As embodied herein, the sample preparation module and the detection module can both be present on a single base substrate and both the sample preparation module and the detection module can include a plurality of electrodes for moving liquid droplets. As embodied herein, such a device can include a first substrate and a second substrate, where the second substrate is positioned over the first substrate and separated from the first substrate by a gap. The first substrate can include a first portion (e.g., proximal portion) at which the sample preparation module is located, where a liquid droplet is introduced into the device, and a second portion (e.g., distal portion) towards which the liquid droplet moves, at which second portion the detection module is located.

The space between the first and second substrates can be up to 1 mm in height, e.g., 0.1 μm, 0.5 μm, 1 μm, 5 μm, 10 μm, 20 μm, 50 μm, 100 μm, 140 μm, 200 μm, 300 μm, 400 μm, 500 μm, 1 μm-500 μm, 100 μm-200 μm, etc. The volume of the droplet generated and moved in the devices described herein can range from about 10 μl to about 5 picol, such as, 10 μl-1 picol, 7.5 μl-10 picol, 5 μl-1 nL, 2.5 μl-10 nL, or 1 μl-100 nL, 800- 00 nL, 10 nL-0.5 μl e.g., 10 μl, 1 μl, 800 nL, 100 nL, 10 nL, 1 nL, 0.5 nL, 10 picol, or lesser.

As embodied herein, first portion and the second portion are separate or separate and adjacent. As embodied herein, the first portion and the second portion are co-located, comingled or interdigitated. The first substrate can include a plurality of electrodes overlaid on an upper surface of the first substrate and extending from the first portion to the second portion. The first substrate can include a layer disposed on the upper surface of the first substrate, covering the plurality of electrodes, and extending from the first portion to the second portion. The first layer can be made of a material that is a dielectric and a hydrophobic material. Examples of a material that is dielectric and hydrophobic include polytetrafluoroethylene material (e.g., Teflon®) or a fluorosurfactant (e.g., FluoroPel™). The first layer can be deposited in a manner to provide a substantially planar surface. A well array can be positioned in the second portion of the first substrate and overlying a portion of the plurality of electrodes and form the detection module. The well array can be positioned in the first layer. As embodied herein, prior to or after fabrication of the well array in the first layer, a hydrophilic layer can be disposed over the first layer in the second portion of the first substrate to provide a well array that have a hydrophilic surface. The space/gap between the first and second substrates can be filled with air or an immiscible fluid. As embodied herein, the space/gap between the first and second substrates can be filled with air.

As embodied herein, the sample preparation module and the detection module can both be fabricated using a single base substrate but a plurality of electrodes for moving liquid droplets can only be present only in the sample preparation module. As embodied herein, the first substrate can include a plurality of electrodes overlaid on an upper surface of the first substrate at the first portion of the first substrate, where the plurality of electrodes do not extend to the second portion of the first substrate. As embodied herein, the plurality of electrodes are only positioned in the first portion. A first layer of a dielectric/hydrophobic material, as described herein, can be disposed on the upper surface of the first substrate and can cover the plurality of electrodes. As embodied herein, the first layer can be disposed only over a first portion of the first substrate. Alternatively, the first layer can be disposed over the upper surface of the first substrate over the first portion as well as the second portion. A well array can be positioned in the first layer in the second portion of the first substrate, forming the detection module that does not include a plurality of electrodes present under the well array.

As embodied herein, the second substrate can extend over the first and second portions of the first substrate. As embodied herein, the second substrate can be substantially transparent, at least in region overlaying the well array. Alternatively, the second substrate can be disposed in a spaced apart manner over the first portion of the first substrate and cannot be disposed over the second portion of the first substrate. Thus, As embodied herein, the second substrate can be present in the sample preparation module but not in the detection module.

As embodied herein, the second substrate can include a conductive layer that forms an electrode. The conductive layer can be disposed on a lower surface of the second substrate. The conductive layer can be covered by a first layer made of a dielectric/hydrophobic material, as described herein. As embodied herein, the conductive layer can be covered by a dielectric layer. The dielectric layer can be covered by a hydrophobic layer. The conductive layer and any layer(s) covering the conductive layer can be disposed across the lower surface of the second substrate or can only be present on the first portion of the second substrate. As embodied herein, the second substrate can extend over the first and second portions of the first substrate. As embodied herein, the second substrate and any layers disposed thereupon (e.g., conductive layer, dielectric layer, etc.) can be substantially transparent, at least in region overlaying the well array.

As embodied herein, the plurality of electrodes on the first substrate can be configured as co-planar electrodes and the second substrate can be configured without an electrode. The electrodes present in the first layer and/or the second layer can be fabricated from a substantially transparent material, such as indium tin oxide, fluorine doped tin oxide (FTO), doped zinc oxide, and the like.

As embodied herein, the sample preparation module and the detection module can be fabricated on a single base substrate. Alternatively, the sample preparation module and the detection modules can be fabricated on separate substrates that can subsequently be joined to form an integrated microfluidic and analyte detection device. As embodied herein, the first and second substrates can be spaced apart using a spacer that can be positioned between the substrates. The devices described herein can be planar and can have any shape, such as, rectangular or square, rectangular or square with rounded corners, circular, triangular, and the like.

The systems, devices, and methods described herein have demonstrated desired performance characteristics not achieved by conventional digital microfluidic devices and reservoirs. For example, the systems, devices, and methods described herein can provide more consistent and precise dispensing of liquid droplets from a sample or reagent reservoir as compared to traditional devices. The configuration of the reservoir electrodes described herein can be used to position a parent fluid volume within a reservoir proximate the reservoir outlet. Such positioning can reduce the tendency of the parent fluid volume to form long liquid tails as a child droplet is separated from, or pinched off from, the parent fluid volume. The creation of such liquid tails during droplet separation or dispensing can result in child droplets with irregular volume.

Moreover, as the volume of the parent fluid volume remaining in the reservoir is reduced as fluid droplets are dispensed therefrom, the volume of further fluid droplets dispensed from traditional devices and systems can be increasingly inconsistent or inaccurate. In some cases, some remainder of the fluid in the reservoir of traditional devices and systems can be unable to be urged from the reservoir, at least without manual intervention, which can lead to waste. The systems, devices, and methods described herein can reduce such inconsistent and inaccurate dispensing as the parent fluid volume in the reservoir decreases. For example, the parent fluid volume in reservoirs in accordance with the disclosed subject matter can be kept proximate the reservoir outlet as the parent fluid volume changes in volume.

While the disclosed subject matter is described herein in terms of certain preferred embodiments, those skilled in the art will recognize that various modifications and improvements can be made to the disclosed subject matter without departing from the scope thereof. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A system for storing and dispensing fluid in a digital microfluidic chip, comprising:

a plurality of individually controlled reservoir electrodes defining a reservoir having an outlet and a first end opposite the outlet, the reservoir configured to store a parent fluid, wherein the plurality of individually controlled reservoir electrodes are in fluidic communication with at least one device electrode proximate the outlet, wherein the at least one device electrode proximate the outlet and at least one of the plurality of individually controlled reservoir electrodes generate electrical actuation forces to dispense at least one droplet from the reservoir through the outlet to the at least one device electrode proximate the outlet, the plurality of individually controlled reservoir electrodes comprising:

a first reservoir electrode proximate the first end, a reservoir outlet electrode proximate the outlet, and at least one intermediate reservoir electrode disposed between the first reservoir electrode and the reservoir outlet electrode;

wherein the first reservoir electrode, the reservoir outlet electrode, and the at least one intermediate reservoir electrode each has an electrode surface area in plan view greater than or equal to an electrode surface area of each of the at least one device electrode proximate the outlet, and a controller configured to:

in response to the controller determining that the parent fluid volume has a first volume, activating a first arrangement of the plurality of individually controlled reservoir electrodes to dispense through the outlet a first child droplet from the parent fluid volume having the first volume in the reservoir, and in response to the controller determining that the parent fluid volume has a second volume, activating a second arrangement of the plurality of individually controlled reservoir electrodes to dispense a second child droplet from the parent fluid having the second volume in the reservoir, wherein the second volume is less than the first volume, and wherein the controller is configured to activate the reservoir electrodes to position the parent fluid volume within the reservoir proximate the reservoir outlet as the parent fluid volume reduces.

2. The system of claim 1, wherein the first reservoir electrode has a first reservoir electrode area, and the at least one intermediate reservoir electrode has an intermediate reservoir electrode area substantially equal to the first reservoir electrode area.

3. The system of claim 2, wherein the reservoir outlet electrode has a reservoir outlet electrode area greater than the first reservoir electrode area.

4. The system of claim 1, wherein the first reservoir electrode, the reservoir outlet electrode, and the at least one intermediate reservoir electrode together define a substantially constant width of the reservoir from the first end to the outlet.

5. The system of claim 1, wherein the reservoir is configured to store a parent fluid volume, and wherein the at least one device electrode proximate the outlet and at least one of the plurality of individually controlled reservoir electrodes are configured to generate opposing electrical actuation forces on at least a portion of the parent fluid volume to dispense the at least one droplet from the parent fluid volume.

6. The system of claim 1, wherein the reservoir is configured to store a parent fluid volume, and wherein the plurality of individually controlled reservoir electrodes are configured to generate allied electrical actuation forces to urge the parent fluid volume toward the outlet to allow substantially all of the parent fluid volume to be dispensed through the outlet.

7. The system of claim 1, wherein the first arrangement of the plurality of individually controlled reservoir electrodes comprises the first reservoir electrode, the reservoir outlet electrode, and the at least one intermediate reservoir electrode, and wherein the second arrangement of the plurality of individually controlled reservoir electrodes consists essentially of the reservoir outlet electrode and the at least one intermediate reservoir electrode.

8. The system of claim 1, wherein at least two of the plurality of individually controlled reservoir electrodes are interdigitated.

9. The system of claim 1, further comprising a bridge electrode between the at least one device electrode proximate the outlet and the reservoir outlet electrode.

10. The system of claim 1, wherein the reservoir is configured to store at least one of a sample, wash buffer, binding member, enzyme substrates, waste fluid, or reagents.

11. The system of claim 1, wherein the reservoir has a volume within a range between 2 μl and 25 μL.

12. A digital microfluidic and analyte detection device, comprising:

a first substrate and a second substrate aligned generally parallel to each other with a gap defined therebetween in side view; and at least one of the first substrate and the second substrate having a plurality of individually controlled reservoir electrodes defining a reservoir having an outlet and a first end opposite the outlet, the reservoir being configured to store a parent fluid volume and being in fluidic communication with the gap, the plurality of individually controlled electrodes comprising:

a first reservoir electrode proximate the first end, a reservoir outlet electrode proximate the outlet, and at least one intermediate reservoir electrode disposed between the first reservoir electrode and the reservoir outlet electrode;

at least one of the first substrate and the second substrate having at least one device electrode proximate the outlet, the at least one device electrode proximate the outlet and at least one of the plurality of reservoir electrodes configured to generate electrical actuation forces to dispense at least one droplet from the reservoir through the outlet to the at least one device electrode proximate the outlet;

wherein the first reservoir electrode, the reservoir outlet electrode, and the at least one intermediate reservoir electrode each has an electrode surface area in plan view greater than or equal to an electrode surface area of each of the at least one device electrode proximate the outlet, and a controller configured to activate a first arrangement of the plurality of reservoir electrodes to dispense through the outlet a first child droplet from the parent fluid volume in response to the controller determining that the parent fluid volume has a first volume, and configured to activate a second arrangement of the plurality of reservoir electrodes to dispense a second child droplet from the parent fluid volume in response to the controller determining that the parent fluid volume has a second volume less than the first volume, wherein the controller is configured to activate the reservoir electrodes to position the parent fluid volume within the reservoir proximate the reservoir outlet as the parent fluid volume reduces.

13. The device of claim 12, wherein the first arrangement of the plurality of individually controlled reservoir electrodes comprises the first reservoir electrode, the reservoir outlet electrode, and the at least one intermediate reservoir electrode, and wherein the second arrangement of the plurality of individually controlled reservoir electrodes consists essentially of the reservoir outlet electrode and the at least one intermediate reservoir electrode.

14. The device of claim 12, wherein the reservoir is configured to store a parent fluid volume, and wherein the plurality of individually controlled reservoir electrodes are configured to generate allied electrical actuation forces to urge the parent fluid volume toward the outlet to allow substantially all of the parent fluid volume to be dispensed through the outlet.

15. The device of claim 12, wherein the at least one of the first substrate and the second substrate has a plurality of the reservoirs in fluidic communication with the gap.

16. The device of claim 15, wherein the at least one device electrode proximate the outlet is at least one of a plurality of device electrodes defining a device array, and the plurality of the reservoirs are disposed about a peripheral region of the device array.

* * * * *